United States Patent [19]

Briscall

[11] 4,137,950
[45] Feb. 6, 1979

[54] FILAMENT-REINFORCED HOLLOW BODY WITH INTERNAL FLANGE AND METHOD OF FORMING SAME

[75] Inventor: Harry Briscall, Reading, England

[73] Assignee: The Secretary of State for Defence in Her Britannic Majesty's Government of the United Kingdom of Great Britain and Northern Ireland, United Kingdom

[21] Appl. No.: 829,114

[22] Filed: Aug. 30, 1977

[30] Foreign Application Priority Data

Sep. 14, 1976 [GB] United Kingdom ............... 38075/76

[51] Int. Cl.² ........................ F16L 9/16; B65H 81/00
[52] U.S. Cl. .................................. 138/172; 60/200 A; 138/109; 138/144; 138/155; 138/173; 156/158; 156/172; 156/175; 156/304; 428/36
[58] Field of Search ............... 156/173, 175, 172, 157, 156/158, 304; 285/423, DIG. 20; 138/DIG. 2, 109, 144, 150, 154, 155, 172, 177, 173; 242/7.21, 7.07, 7.22; 220/3, 71, 72, 83, DIG. 23, 1 B; 428/36, 35

[56] References Cited

U.S. PATENT DOCUMENTS

| | | | |
|---|---|---|---|
| 2,991,210 | 7/1961 | Matkovich | 156/175 |
| 3,052,585 | 9/1962 | Anderson | 156/175 |
| 3,105,786 | 10/1963 | Anderson | 156/173 |
| 3,341,387 | 9/1967 | Boggs | 156/175 |
| 3,655,468 | 4/1972 | Bostone et al. | 156/173 |
| 3,970,495 | 7/1976 | Ashton et al. | 156/175 |

*Primary Examiner*—Michael W. Ball
*Attorney, Agent, or Firm*—Pollock, Vande Sande and Priddy

[57] ABSTRACT

A filament-reinforced resin-impregnated hollow body having at least one internal circumferential strengthening flange or rib is fabricated by winding a first filamentary winding on each of two mandrel portions, the filament being wound across at least one end of each portion so that the winding extends inwards towards the axis of each mandrel portion. With these two ends spaced opposite one another, a second filamentary winding is wound between the inwardly extending parts of the first winding. A third winding is then applied over the first and second windings. After curing the resin-impregnated windings, the mandrel is removed, leaving an internal flange formed by the inwardly extending parts of the first winding in conjunction with the second winding.

13 Claims, 6 Drawing Figures

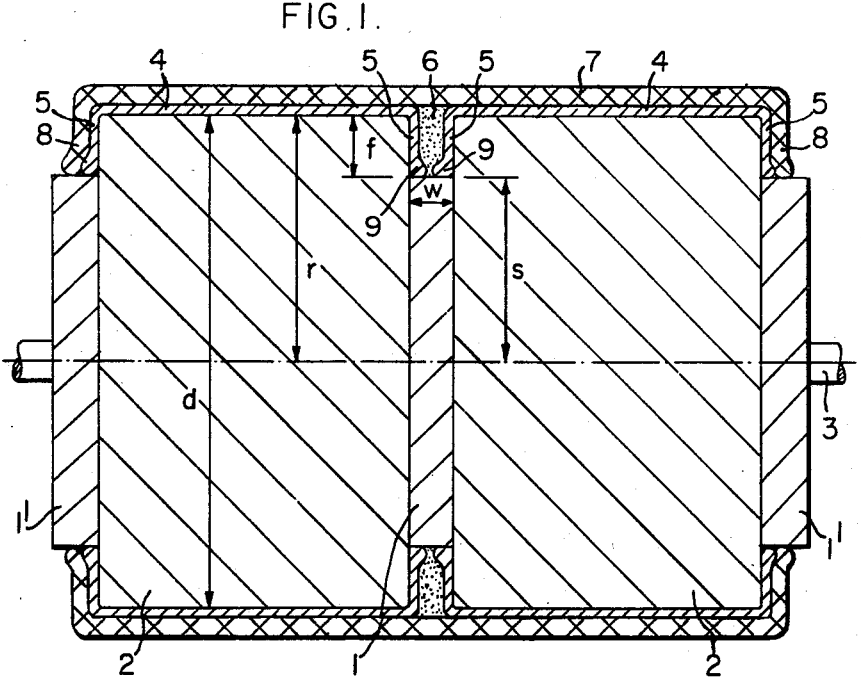
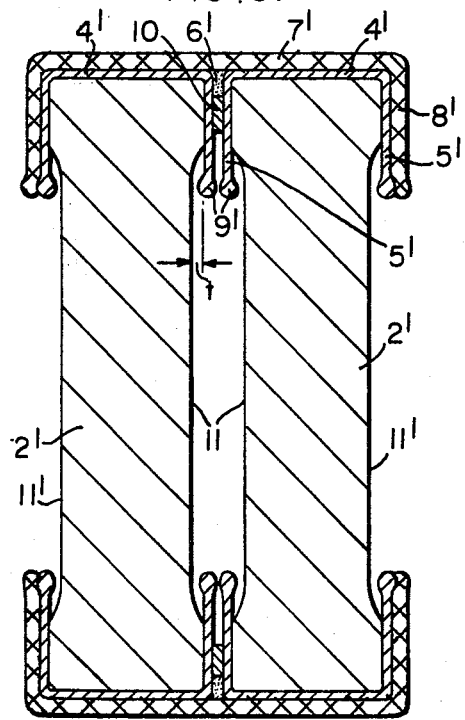
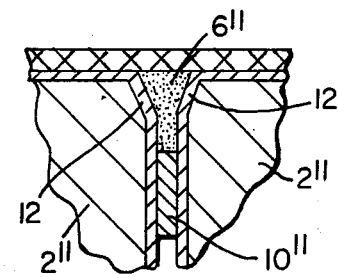

FILAMENT-REINFORCED HOLLOW BODY WITH INTERNAL FLANGE AND METHOD OF FORMING SAME

BACKGROUND OF THE INVENTION

This invention relates to methods of fabricating filament-reinforced hollow bodies.

Hollow bodies can be fabricated by winding a suitable filament, e.g. glass or carbon-fibre, on to a mandrel having an appropriately shaped outer surface, the winding being impregnated with a suitable resin, e.g. an epoxy resin. The impregnation can be effected during winding, by using filament wetted by the resin or pre-impregnated filament ("pre-preg"), or subsequent to winding with dry non-impregnated filament. For some purposes a light-weight thin-walled body of large cross-section may be required, and the problem arises of obtaining such a body of adequate strength.

One method of strengthening such a structure is to provide it with one or more circumferential ribs or flanges located internally between the ends. Such ribs or flanges might be produced separately and stuck to the inner surface of a smooth body formed as above. However, the present invention provides a superior method by which the flanges are formed integrally with the body.

SUMMARY OF THE INVENTION

According to the present invention a method of fabricating a filament-reinforced hollow body having at least one internal circumferential flange comprises:

winding a separate first filamentary winding on each of two mandrel portions, the filament being wound across at least one end of each said portion so that the winding extends stably inwards towards the axis of each mandrel portion;

with said ends spaced apart opposite one another, winding a second filamentary winding between said inwardly extending parts of the first winding;

winding a third filamentary winding over the first and second windings;

and removing the mandrel portions.

The second filamentary winding may be wound to a level at least approximately the same as the level of the first winding, but this is not essential.

Preferably the first and third windings comprise helical windings. The second winding may be circumferential.

Preferably the first filamentary winding is also wound across the other ends of the mandrel portions and extends stably inwards therat in a manner similar to that at the first-mentioned ends. A helical winding which is stable on the mandrel portions is conveniently produced by such cross-winding at both ends, as hereinafter explained. However other methods of stabilizing the winding at said other ends may be used, e.g. small pegs around which the winding passes.

In accordance with known practices the filamentary windings may be applied as a resin-wetted tow roving, or in a "pre-preg" form, or dry-wound for subsequent resin impregnation, the resin being cured before removing the mandrel.

The first winding may be applied to each mandrel portion with the mandrel portions located independently of one another, the wound portions being subsequently spaced apart relative to one another for application of said second and third windings. The wound portions may be spaced apart by a ring located between the inwardly extending parts of the first winding.

To facilitate producing relatively narrow flanges, the oppositely-spaced end-surfaces of the mandrel portions may be adapted by recessing, or by use of annular mandrel portions, to accommodate the turn-round edges of the inwardly extending parts of the first winding.

To produce flanges having different sectional shapes, the oppositely-spaced end-surfaces of the mandrel portions may be shaped to the outline of the specified section, e.g. their edges may be shaped to produce a flange having an enlarged base section.

As an alternative to applying the first winding to mandrel portions located independently of each other, it may be applied to a mandrel which includes a narrow portion of reduced cross-section located at the desired flange position between two wider portions, the filament being wound separately on to each wider portion and across the ends thereof adjacent the narrow portion so that the winding on each wider portion extends stably inwards towards the circumferential surface of the narrow portion.

DESCRIPTION OF THE DRAWINGS

To enable the nature of the present invention to be more readily understood, attention is directed, by way of example, to the accompanying drawings (not to scale) wherein:

FIG. 1 is a sectional elevation of one form of mandrel showing, in cross-section, windings for an internally flanged, filament-reinforced, hollow cylinder thereon.

FIG. 3 is a sectional elevation of a modification of the form of mandrel shown in FIG. 1 with windings thereon.

FIG. 4 is a sectional elevation of part of a further modified form of mandrel.

DESCRIPTION OF PREFERRED EMBODIMENTS

Figure 2A:
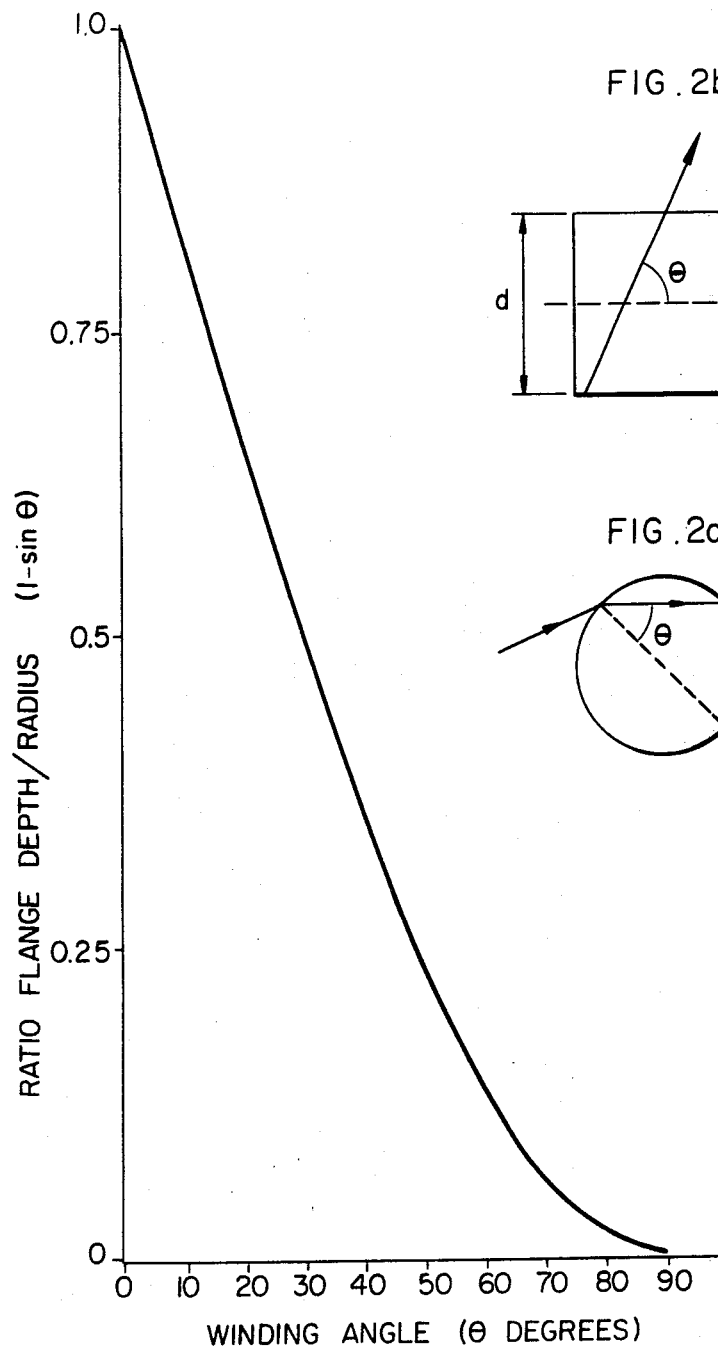
FIG. 2A is a graph showing the relationship between the flange depth and the winding angle $\theta$, the latter angle being identified by FIGS. 2B and 2C.

FIG. 1 shows a cylindrical mandrel comprising a narrow portion 1 located between two wider portions 2. The mandrel shown is for fabrication of a hollow right circular cylinder having an internal diameter equal to that of the portions 2 and an internal flange at the position of portion 1. The mandrel also conveniently includes similar narrow portions 1' at the remote ends of portions 2. The mandrel is mounted on a rotatable shaft 3. The mandrel portions may each be formed of a plurality of metal, e.g. aluminum, plates of appropriate diameter stacked on the shaft 3, having their outer edges smoothed and polished to form a cylindrical surface.

After coating the above surface with a conventional release agent, and using a conventional helical winding machine, a first filamentary winding 4 is applied separately to each portion 2. The filament may be a glass-fibre tow roving and a "wet" winding technique may be used, i.e. the filament is wetted with a curable liquid resin before winding. Other filaments, such as carbon fibre, can also be used, as is known practice.

At each end of the portions 2 the winding is anchored stably on the mandrel by winding the filament across the flat end of the portion 2 as a chord, before reversing the direction of the wind along the mandrel. The superimposed chords of the plurality of passes to and fro along the mandrel thereby form the parts 5 of each winding 4, which extend inwards towards the axis of the mandrel. The parts 5 adjacent the narrow mandrel portion 1 form part of the required flange.

Figure 2B:
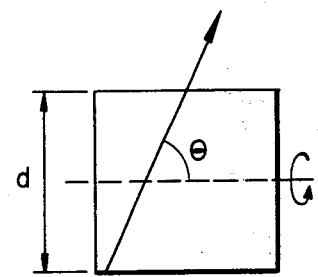
Figure 2C:
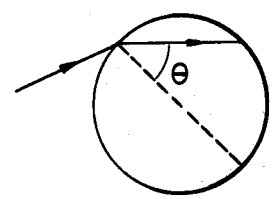

The depth f of the parts 5 relative to the radius r of the mandrel portions 4, for a stably anchored winding 5 (i.e. where the chords are in an equilibrium position across the mandrel ends and do not slide either towards or away from the mandrel axis), can be shown to vary with the winding angle $\theta$ as shown in FIG. 2A, viz stability is obtained when $f/r = 1-\sin\theta$, or equivalently the stable chord length $c = d \cos\theta$ where d is the diameter of the mandrel end. FIGS. 2B and 2C show the angle $\theta$ of the filament path (continuous line) relative to the axis and the mandrel diameter respectively. The radius s of the mandrel portion 1 is made approximately equal to r-f, f being determined by r and $\theta$ (FIG. 2A). In applying the winding, the chord angle $\theta$ is determined by the pause at the end of each pass along the mandrel together with the travel of the winding eye beyond its end, as will be familiar to those skilled in the winding art.

Following the first winding 4, a second wet winding 6, of circumferential type, is wound between parts 5 of winding 4 to a level substantially level with that of winding 4 as shown. This is followed by a third wet winding 7, helical like winding 4, which overlaps the first and second windings and is anchored stably at the remote ends of mandrel portions 2 by inward extending parts 8 formed like parts 5 of winding 4.

Before curing, excess wet resin is removed and, to improve the surface finish, the wet windings are covered by a polyester shrink film which has been waxed, polished and sprayed with a release agent. The mandrel and winding are then heated to cure the resin.

After cooling, the shrink film is removed and the winding parts 8 and their underlying parts 5 are cut away. The mandrel portions 2 are then removed, e.g. by extraction bolts in tapped holes in portions 2 bearing on portion 1, followed by portion 1, leaving a hollow cylinder strengthened by the internal flange formed by parts 5 of winding 4 together with winding 6. Extraction of the mandrel portions may be eased by making them slightly tapered. To reduce any tendency for air pockets to form between the shrink film and the surface of winding 7, leading to surface defects, the film may be shrunk progressively along the cylindrical surface. This also helps to remove excess resin.

Alternative known procedures for finishing the wound cylinder after applying the windings can be used.

As seen from FIGS. 2A-2C, for a stable winding the depth of the flange is related to the winding angle $\theta$. Some variation in f for a given value of $\theta$ is possible owing to friction between the tow and the mandrel, but such permissible variations are small. In practice the mandrel portion 1, whose diameter is set at approximately the calculated flange depth, gives a little more stability and therefore some freedom in adjusting the winding machine settings to produce a pattern on portions 2 in which adjacent turns abut to provide complete surface coverage. Hence also the presence of the mandrel portions 1'.

In FIG. 1 the minimum width w of the flange is determined by the thick "turn-round edges" 9 which are formed by the superimposed chords of tow. The flange can be made wider by increasing the width of mandrel portion 1 and increasing the number of turns in winding 6.

For particular applications, if the winding angle $\theta$ necessary for the overall mechanical properties of the cylinder produces a flange too deep for the application, the surplus can be removed after curing.

A deeper flange may be obtained by reducing the diameter of mandrel portion 1, though this may make winding 6 more difficult to apply because of the edges 9. Moreover the shear-strength of the flange below the edges 9 is reduced because the turns there are circumferential only.

Where only a single flange is required, the mandrel portions 1' are not essential but assist in maintaining the stability of windings 4 and 7 as described above. In some applications it may be desired to retain also the end-flanges formed by parts 8 and 5 of the windings; in such cases the mandrel portions 2, and preferably also 1, are made collapsible or frangible to allow their extraction past these end-flanges. For example the mandrel portions can be made of rigid polyurethane foam, or other material, which is broken up and removed piecemeal after curing the resin. For large-diameter bodies the mandrel (foam or otherwise) can be of annular form, and made of separable segments supported on a demountable framework.

A cylinder having two flanges between its ends can be fabricated by adding a further wide mandrel portion 2 beyond portion 1' and forming thereat a flange similar to that formed at portion 1. In this way as many flanges as necessary can be formed, collapsible or frangible mandrel portions again being used to allow their extraction.

A further winding or windings can be interposed between windings 4 and 7, e.g. a circumferential winding, to meet mechanical requirements, and likewise over winding 7. Indeed each of the windings may be a composite of several individual winding layers.

In the form of the invention described with reference to FIG. 1, the windings are applied to a mandrel formed of portion 1, two portions 1' and two portions 2 which are assembled together ab initio, but this is not essential. It may sometimes be more convenient to apply winding 4 to each portion 2 before locating the portions 2 in their final relative positions (e.g. by mounting them on the winding machine one at a time), and thereafter mounting them together on the machine in their final positions before applying the subsequent windings. In FIG. 3 the two mandrel portions 2' are assumed to have been wound independently with winding 4' in this way and thereafter mounted end-to-end as shown for application of windings 6' and 7'.

Also, although the presence of portions 1 and 1' can make it easier to reconcile the stability and coverage requirements of the windings 4 and 7 as mentioned earlier, they are not essential. Stable windings can be obtained relying upon the $f/r = 1-\sin\theta$ relationship, and in FIG. 3 the portions 1 and 1' are omitted. To space the mandrel portions 2' the required distance apart to form the flange, and to provide, in effect, a mandrel portion for winding 6', a flat ring 10, suitably of flexible material such as rubber, is mounted between the two winding parts 5'. Ring 10 can be held in place by pressure of the adjacent parts, or can be positively secured to one of the parts 5' by pins or adhesive, and after curing is removed with the abutting regions of the parts 5'.

Where the flange width w is to be relatively small, the thickness of the "turn-round edges" 9' of the winding 4' may hinder the parts 5' being brought sufficiently close together. This difficulty is avoided in FIG. 3 by recessing an inner region of the end-surface 11 of each mandrel portion 2' (as shown at t) to accommodate the edges 9'. (The recessed region need not, of course, extend to the axis as shown). The non-facing end-surfaces 11' are also shown recessed to allow the forming of further flanges thereat if required. Using annular mandrel portions whose inner periphery has a diameter greater than the edges 9', this difficulty does not arise.

FIG. 4 shows how a flange having an enlarged base section can be formed by suitably chamfering the edges of the mandrel portions 2" as shown at 12. Flanges having other sectional shapes can be produced by shaping the end-surfaces of the mandrel portions to the outline of the specified section.

A typical winding sequence (e.g. for the windings in FIG. 3) may be as follows:

Winding 4' (on each mandrel portion 2').
 First layer: circumferential (on mandrel periphery only)
 Second layer: ditto
 Third layer: 45° helical (across ends)
 Fourth layer: ditto (reverse direction)
Winding 6'
 Circumferential
Winding 7'
 First and second layers: circumferential (periphery only)
 Third layer: 45° helical (across ends)
 Fourth layer: ditto (reverse direction)
 Fifth and sixth layers: circumferential (periphery only)

It should be noted that the second winding can be applied simultaneously with a part of the third winding, e.g. in the above typical winding sequence the winding 6' can be continuous with the first circumferential layer of winding 7'.

In the described embodiments the second windings 6 and 6' are wound to the same level as the first windings 4 and 4'. This produces a body having a uniform outer surface but is not essential, e.g. a body additionally having an outer circumferential rib may be produced by extending windings 6 or 6' above the level of the windings 4 and 4'. It is also possible to terminate windings 6 or 6' below the level of the windings 4 or 4', leaving a gap which may be filled otherwise, e.g. by a circumferential hollow square-section tube, which may be advantageous from the weight-saving aspect.

Although in the described embodiments the product is a right circular cylinder (disregarding the slight taper of the mandrel portions in FIG. 1 to ease extraction), this is not essential. By using appropriately shaped mandrels, hollow bodies of other shapes can be produced, e.g. conical. Nor need the shape be symmetrical about an axis, e.g. an aircraft engine cowl produced by the method may have a surface whose longitudinal profile is a curve which varies around the circumference of the cowl.

I claim:

1. A method of fabricating a filament-reinforced resin-impregnated hollow body having at least one internal circumferential flange comprising:
 winding a separate first filamentary winding on each of two mandrel portions, the filament being wound across at least one end of each said portion so that the winding extends stably inwards towards the axis of each mandrel portion;
 with said ends spaced apart opposite one another, winding a second filamentary winding between said inwardly extending parts of the first winding;
 winding a third filamentary winding over the first and second windings;
 and removing the mandrel portions.

2. A method as claimed in claim 1 wherein the second winding is wound to a level at least approximately the same as the level of the first winding.

3. A method as claimed in claim 1 wherein the first and third windings comprise helical windings.

4. A method as claimed in claim 3 wherein the second winding is circumferential.

5. A method as claimed in claim 3 wherein the first filamentary winding is also wound across the other ends of said mandrel portions and extends stably inwards thereat.

6. A method as claimed in claim 1 wherein said first winding is applied to each said mandrel portion with the mandrel portions located independently of one another, said wound portions being subsequently spaced apart relative to one another for application of said second and third windings.

7. A method as claimed in claim 6 wherein said wound portions are spaced apart by a ring located between said inwardly extending parts of the first winding.

8. A method as claimed in claim 1 wherein the oppositely-spaced end-surfaces of the mandrel portions are adapted by recessing, or by use of annular mandrel portions, to accommodate the turn-round edges of the inwardly extending parts of the first winding.

9. A method as claimed in claim 1 for producing a flange having a specified sectional shape wherein the oppositely-spaced end-surfaces of the mandrel portions are shaped to the outline of the specified section.

10. A method as claimed in claim 9 wherein the edges of the end-surfaces are shaped to produce a flange having an enlarged base section.

11. A method as claimed in claim 1 comprising the steps of winding said first filamentary winding on to a mandrel which includes a narrow portion of reduced cross-section located at the desired flange position between two wider portions; the filament being wound separately on to each wider portion and across the ends thereof adjacent the narrow portion so that the winding on each wider portion extends stably inwards towards the circumferential surface of the narrow portion.

12. A filament-reinforced hollow body having at least one internal circumferential flange produced by a method as claimed in claim 11.

13. A filament-reinforced hollow body having at least one internal circumferential flange produced by a method as claimed in claim 1.

* * * * *